US006816464B1

(12) United States Patent
Scott et al.

(10) Patent No.: US 6,816,464 B1
(45) Date of Patent: Nov. 9, 2004

(54) METHOD, SYSTEM, AND COMPUTER PROGRAM PRODUCT FOR ROUTE QUALITY CHECKING AND MANAGEMENT

(75) Inventors: Mark D. Scott, Ashburn, VA (US); Anita T. Cheng, Ashburn, VA (US)

(73) Assignee: Array Telecom Corporation, Herndon, VA (US)

( * ) Notice: Subject to any disclaimer, the term of this patent is extended or adjusted under 35 U.S.C. 154(b) by 735 days.

(21) Appl. No.: 09/660,920

(22) Filed: Sep. 13, 2000

(51) Int. Cl.$^7$ .......................... H04L 12/26; H04J 1/16; G08C 13/00; G06F 11/00; G01R 31/08
(52) U.S. Cl. .................... 370/252; 370/238; 370/351; 370/401
(58) Field of Search ................................ 370/238, 252, 370/352, 353, 356, 401, 355, 468; 709/238, 241, 245, 218, 227

(56) References Cited

U.S. PATENT DOCUMENTS

| | | | | |
|---|---|---|---|---|
| 5,452,294 A | * | 9/1995 | Natarajan | 370/351 |
| 5,621,727 A | | 4/1997 | Vaudreuil | 370/60 |

(List continued on next page.)

FOREIGN PATENT DOCUMENTS

| | | | | |
|---|---|---|---|---|
| WO | WO 97/14238 A1 | 4/1997 | | H04L/12/46 |
| WO | WO 97/23078 A1 | 6/1997 | | H04L/12/56 |
| WO | WO 97/27692 A1 | 7/1997 | | H04L/12/56 |
| WO | WO 97/28628 A1 | 8/1997 | | H04L/12/56 |

OTHER PUBLICATIONS

Anquetil, L–P. et al., "Media Gateway Control Protocol And Voice Over IP Gateways," *Alcatel Telecommunications Review*, pp. 151–157 (Apr.–Jun. 1999).

*Array Series 3000 Users Manual*, Array Telecom Corp, Entire Manual (Aug. 27, 1999).

*ctvoice IP Telephony*, Product Brochure, Comdial, 6 pages (Copy obtained Aug. 1999).

*ctvoice System User's Manual*, Comdial, Entire Manual (Jun. 1998).

Held, G., *Voice Over Data Networks*, McGraw–Hill, Entire Book (1998).

McConnell, B., *How to Build an Internet PBX Ahmed Borg*, at http://www.google.com . . . , 13 pages, (Apr. 1997).

Prosise, J., "Programming Windows 95 with MFC, Part VII: The Document/View Architecture," *Microsoft Systems Journal*, Miller Freeman, 35 pages (Feb. 1996).

Sheldon, T., *Encyclopedia of Networking, Electronic Edition*, McGraw–Hill, pp. 1043–1050 (1998).

Yang, C., *INETPhone: Telephone Services and Servers on Internet*, at http://www.ds.internic.net/rfc/rfc1789.txt, 6 pages, (Apr. 1995).

Primary Examiner—Man Phan
(74) Attorney, Agent, or Firm—Sterne, Kessler, Goldstein & Fox P.L.L.C.

(57) ABSTRACT

A method, system and computer program product for route checking and management is described herein. In a voice over internet protocol environment, the invention allows for the testing of routes among various gateways. In one embodiment, gateways include routing managers for checking and storing route information. The method of the invention includes checking candidate routes for the level of quality, location and cost levels. Further, users can prioritize routes based on these criteria.

23 Claims, 8 Drawing Sheets

U.S. PATENT DOCUMENTS

| | | | |
|---|---|---|---|
| 5,742,596 A | 4/1998 | Baratz et al. | 370/356 |
| 5,757,871 A | 5/1998 | Furukawa et al. | 375/372 |
| 5,790,538 A | 8/1998 | Sugar | 370/352 |
| 5,790,543 A | 8/1998 | Cloutier | 370/395 |
| 5,805,602 A | 9/1998 | Cloutier et al. | 370/516 |
| 5,812,840 A | 9/1998 | Shwartz | 395/604 |
| 5,870,464 A | 2/1999 | Brewster et al. | 379/219 |
| 5,892,822 A | 4/1999 | Gottlieb et al. | 379/220 |
| 5,897,613 A | 4/1999 | Chan | 704/210 |
| 5,900,000 A | 5/1999 | Korenshtein | 707/200 |
| 5,940,479 A | 8/1999 | Guy et al. | 379/93.01 |
| 5,940,827 A | 8/1999 | Hapner et al. | 707/8 |
| 5,940,829 A | 8/1999 | Tsuiki et al. | 707/10 |
| 5,940,832 A | 8/1999 | Hamada et al. | 707/100 |
| 5,953,405 A | 9/1999 | Miloslavsky | 379/265 |
| 6,356,545 B1 * | 3/2002 | Vargo et al. | 370/355 |
| 6,363,065 B1 * | 3/2002 | Thornton et al. | 370/352 |
| 6,363,319 B1 * | 3/2002 | Hsu | 701/202 |
| 6,366,560 B1 * | 4/2002 | Ohiwane et al. | 370/238 |
| 6,385,193 B1 * | 5/2002 | Civanlar et al. | 370/352 |
| 6,404,746 B1 * | 6/2002 | Cave et al. | 370/262 |
| 6,426,955 B1 * | 7/2002 | Dalton, Jr. et al. | 370/401 |
| 6,483,808 B1 * | 11/2002 | Rochberger et al. | 370/238 |
| 6,487,172 B1 * | 11/2002 | Zonoun | 370/238 |
| 6,529,499 B1 * | 3/2003 | Doshi et al. | 370/352 |
| 6,584,110 B1 * | 6/2003 | Mizuta et al. | 370/401 |
| 6,597,684 B1 * | 7/2003 | Gulati et al. | 370/351 |
| 6,600,738 B1 * | 7/2003 | Alperovich et al. | 370/352 |
| 6,614,765 B1 * | 9/2003 | Bruno et al. | 370/255 |

* cited by examiner

METHOD, SYSTEM, AND COMPUTER PROGRAM PRODUCT FOR ROUTE QUALITY CHECKING AND MANAGEMENT

BACKGROUND OF THE INVENTION

1. Field of the Invention

The invention relates generally to the field of voice over Internet protocol technology. More particularly, the invention relates to route testing and selection over packet-switched networks.

2. Related Art

Voice over Internet protocol (VoIP) communications services provide telephony services over packet-switched networks, like the Internet. In order to maintain call quality, VoIP services are concerned with route quality. High route quality makes for more reliable and clearer conversations. Route checking and selection over the packet switched network (like the Internet) is necessary to ensure quality of service.

Unlike typical data, voice data is extremely time dependent. Transmission delays and variations in the transmission rate alter the voice data received by the destination.

In a packet-switched network, latency and jitter are measurable qualities of network performance. Latency is the amount of time it takes a packet to reach its destination. Jitter is the variation in latency. The route is the path in the network from the origin of a packet or packets to their destination. A route can be a direct end-to-end connection path, or it can consist of a path linked by any number of routers, switches, gateways, gatekeepers, etc.

Latency and jitter can degrade the communication path between any two points on a packet-switched network, like the Internet. In a VoIP environment, latency will be perceived by the end users as a delay in the response of the remote site (or other user). Furthermore, jitter is the variation in latency from one packet to another which can be perceived as a stammering in the conversation.

Latency and jitter each impact communication differently. For example, if packets always arrived 50 milliseconds (ms) after being transmitted, then there would be a 50 ms latency and no jitter. In another example, however, if packet #1 arrived 100 ms after transmission, packet #2 arrived 50 ms after transmission, and packet #3 arrived 150 ms after transmission, there would be an average jitter of +/−33 ms. In VoIP applications, jitter is often more critical than latency. Jitter can cause a packet to arrive too late to be useful. The effect is that the packet may be delayed enough that the end user will hear a pause in the voice that is talking to them, which is very unnatural if it occurs during the middle of a word or sentence.

Jitter typically occurs when the network utilization is too high, and packets are being queued by gateways, switches, routers or other similar devices, causing delivery times to become unpredictable. The Internet, because of its complex structure, is often subject to varying degrees of jitter. Jitter variation can occur at different locations and at different times depending upon network traffic and other conditions.

Conventional techniques can calculate the jitter and latency present in a route. Some VoIP systems can select routes based on the lowest jitter and/or latency. Other systems can include management of the route selection process in response to network conditions.

However, these techniques are not conducive to rapidly changing network conditions and do not provide real-time route checking and selection. Additionally, these techniques do not take into account the costs of switching from the packet switched network to the public switched telephone network (PSTN) in order to maintain quality of service.

Furthermore, conventional systems do not allow calling parties to make route selections on a per call basis.

Still further, conventional systems do not allow users to supply their own criteria used in the checking and selection of routes.

Therefore, in view of the above, what is needed is a system, method and computer program product for route quality checking and management. Further, what is needed is a system, method and computer program product that can test and score routes on a network based on criteria provided by a user. Such a system would provide the optimal route for a call based on the provided criteria. Furthermore, what is needed is a system, method and computer program product that enables users to access the route quality checking and management system and provide individual or group routing preferences and/or other route information so that the system can select the proper route for that individual or group.

SUMMARY OF THE INVENTION

The invention is directed to a system, method and computer program product for a route quality checking and management system that satisfies the above-stated needs. The method of the present invention involves a routing manager or a route management module implemented at a gateway for determining which other gateways are available to it. A gateway can be any server enabled for routing voice data packets. The method involves the gateway determining the candidate routes to the other gateways, testing those candidate routes, determining candidate route statistics, scoring each candidate route tested, prioritizing each scored route and storing this priority and score information. In one embodiment, a routing manager on a gateway tests the routes to other gateways so that it can use the proper routes based on the preferences of users.

The method of the invention for checking a network route includes a routing manager determining a gateway available for routing, where the gateway is capable of responding to a request on the communications network. The routing manager determines a candidate route to the gateway, where the candidate route is within the communications network. Routing manager tests the candidate route to a gateway using quality measurement packets, where the quality measurement packets include route information. From the route information, the routing manager determines route statistics, where the route statistics are based on routing information contained within said quality measurement packets. The routing manager score the candidate route based on the route statistics.

In an embodiment, the method of the invention is implemented in a communications network that includes a packet-switched network, such as frame relay or the Internet. Furthermore, in other embodiments, the method of the invention is implemented in a communications network that includes a public switched telephone network (PSTN) or a combination of a PSTN and a packet-switched network.

The route information utilized by the invention includes the latency, time jitter, and lost packet information.

In an embodiment, the method of the invention includes functionality for the routing manager to prioritize the candidate route among other tested routes based on the score obtained for that candidate route. In other embodiments, the routing manager has access to a database for storing score information related to the candidate route(s) for use in route selection.

In one embodiment, the testing functions of the method of the invention include configuring the parameters for quality measurement packets to be sent to a gateway where the parameters include the packet interval, packet length, number of packets, and time limit. The routing manager includes a graphical user interface (GUI) for configuring these parameters.

Additionally, the routing manager includes a GUI for configuring the scoring table of the invention. Thus, the routing manager configures the scoring table for use in scoring candidate routes where the table includes a quality score, packet loss, average delay, and average jitter. In other embodiments, the routing manager includes a GUI for configuring the route ordering applied for a gateway, where the route ordering includes file logging information, quality of service threshold, and timeout amount.

According to embodiments of the invention, the routing manager forwards quality measurement packets to a gateway, where the quality measurement packets include routing information; and the routing manager receives returned quality measurement packets from a gateway, where the returned quality measurement packets include routing information.

The method of the invention for checking a network route includes a routing manager that determines an available gateway for routing, where the gateway is capable of responding to a request on the communications network. The routing manager determines a candidate route to the gateway, where the candidate route is within the communications network.

The routing manager tests the candidate route to a gateway using quality measurement packets, where the quality measurement packets include route information. From the route information, the routing manager determines route statistics, where the route statistics are based on routing information contained within said quality measurement packets. The routing manager score the candidate route based on the route statistics.

In an embodiment, the method of the invention is implemented in a communications network that includes a packet-switched network, such as frame relay or the Internet. Furthermore, in other embodiments, the method of the invention is implemented in a communications network that includes a public switched telephone network (PSTN) or a combination of a PSTN and a packet switched network.

The route information utilized by the invention includes the latency, time jitter, and lost packet information.

In an embodiment, the method of the invention includes functionality for the routing manager to prioritize the candidate route among other tested routes based on the score obtained for that candidate route. In other embodiments, the routing manager has access to a database for storing score information related to the candidate route(s) for use in route selection.

In one embodiment, the testing functions of the method of the invention include configuring the parameters for quality measurement packets to be sent to a gateway where the parameters include the packet interval, packet length, number of packets, and time limit. The routing manager includes a graphical user interface (GUI) for configuring these parameters.

Additionally, the routing manager includes a GUI for configuring the scoring table of the invention. Thus, the routing manager configures the scoring table for use in scoring candidate routes where the table includes a quality score, packet loss, average delay, and average jitter. In other embodiments, the routing manager includes a GUI for configuring the route ordering applied for a gateway, where the route ordering includes file logging information, quality of service threshold, and timeout amount.

According to embodiments of the invention, the routing manager forwards quality measurement packets to a gateway, where the quality measurement packets include routing information; and the routing manager receives returned quality measurement packets from a gateway, where the returned quality measurement packets include routing information.

The system and computer program product of the present invention includes a routing manager within a gateway coupled to both a network, such as the Internet, and the PSTN, via a local exchange, through which users can access the gateway either over the network or from a device connected to the local exchange. In one embodiment, the system contains numerous modules operating either in a redundant or distributed manner, as well as in a serial or parallel manner. In another embodiment, the gateway includes a database to store information collected by the routing manager.

In one embodiment of the invention, a gateway is located in a different local exchange from other gateways to provide access to specific geographical locations from the network. In another embodiment, more than one gateway can be connected to any given local exchange. In this embodiment, other gateways can prioritize route selection based on the utilization of any one of the gateways located in a given local exchange.

The computer program product of the present invention further includes a graphical user interface (GUI) for entering the specific criteria used by the method of the present invention for checking and selecting routes.

The method of the present invention includes a route testing routine. In one embodiment, the testing routine configures packet parameter(s), configures a scoring table, and configures a route order. The method of the present invention includes a testing routine where test packet(s) are sent and received for scoring and determination of route quality.

The route checking and management system supplies route information that describes the route. Furthermore, the route checking and management system includes the functionality, in hardware or software or a combination of hardware and software, for performing the methods described herein.

While the invention is described in terms of the above embodiments, this is for convenience only and is not intended to limit its application. In fact, after reading the following description, it will be apparent to one skilled in the relevant art(s), based on the teachings herein, how to implement the invention in alternative embodiments (e.g., using gateways in neighboring local exchanges, and/or stacking gateways in a single local exchange).

Furthermore, while the following description refers to the global Internet, it is not intended to limit the application of the invention. It will be apparent to one skilled in the relevant art how to implement the following invention, in any computer network, combination of networks or other alternative embodiments. For example, other Voice over Packet (VoP) networks include frame relay and asynchronous transfer mode (ATM) enabled networks.

One advantage of the invention is that a user can select the routes to other gateways to be tested.

Another advantage of the invention is that a user can select the criteria applied to candidate routes so that the proper route is selected.

Yet another advantage of the invention is that the system can test routes as the call is being placed and select the best route for that particular call. Furthermore, a user attempting to place a call where the level of quality is below a determined level can have the call routed to the nearest gateway with an acceptable level of quality.

Further features and advantages of the invention as well as the structure and operation of various embodiments of the invention are described in detail below with reference to the accompanying drawings.

BRIEF DESCRIPTION OF THE FIGURES

The accompanying drawings, which are incorporated herein and form a part of the specification, illustrate the invention and, together with the description, further serve to explain the principles of the invention and to enable a person skilled in the pertinent art to make and use the invention. In the drawings.

The invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

In summary, the routing manager of the invention connects to other modules of the gateway to access information about other gateways and candidate routes to those gateways. In an alternative embodiment, the routing manager is able to perform tracing operations to determine the candidate routes to gateways. Once candidate routes are obtained, the routing manager tests the routes to determine their quality of service.

Candidate routes are assigned scores (also known as a level). The routing manager can be pre-set with various levels. Additionally, the routing manager can be pre-set with route ordering levels which prioritize the various aspects of a route. These aspects can include the level assigned to a tested route, but this is optional. In other embodiments, aspects include the address of the destination gateway, the cost involved to route to that gateway, etc.

In an embodiment, the routing manager provides the ordered routes before a user places a call. In another embodiment, the routing manager is configured to test candidate routes to a designation gateway whenever a user requests a connection to a call that may utilize that destination gateway.

In brief, a user of the invention is a caller known to the VoIP system. When the system receives a call request from the user, the system accesses user specific information (route ordering) and the destination address (i.e., the number being called/requested) to determine the candidate routes to use in connecting the call. The system tests the candidate routes to ensure call quality. The system may use route quality statistics, along with user specific information, to determine the proper route. These and additional embodiments and examples of the invention are now discussed in greater detail.

Figure 1:
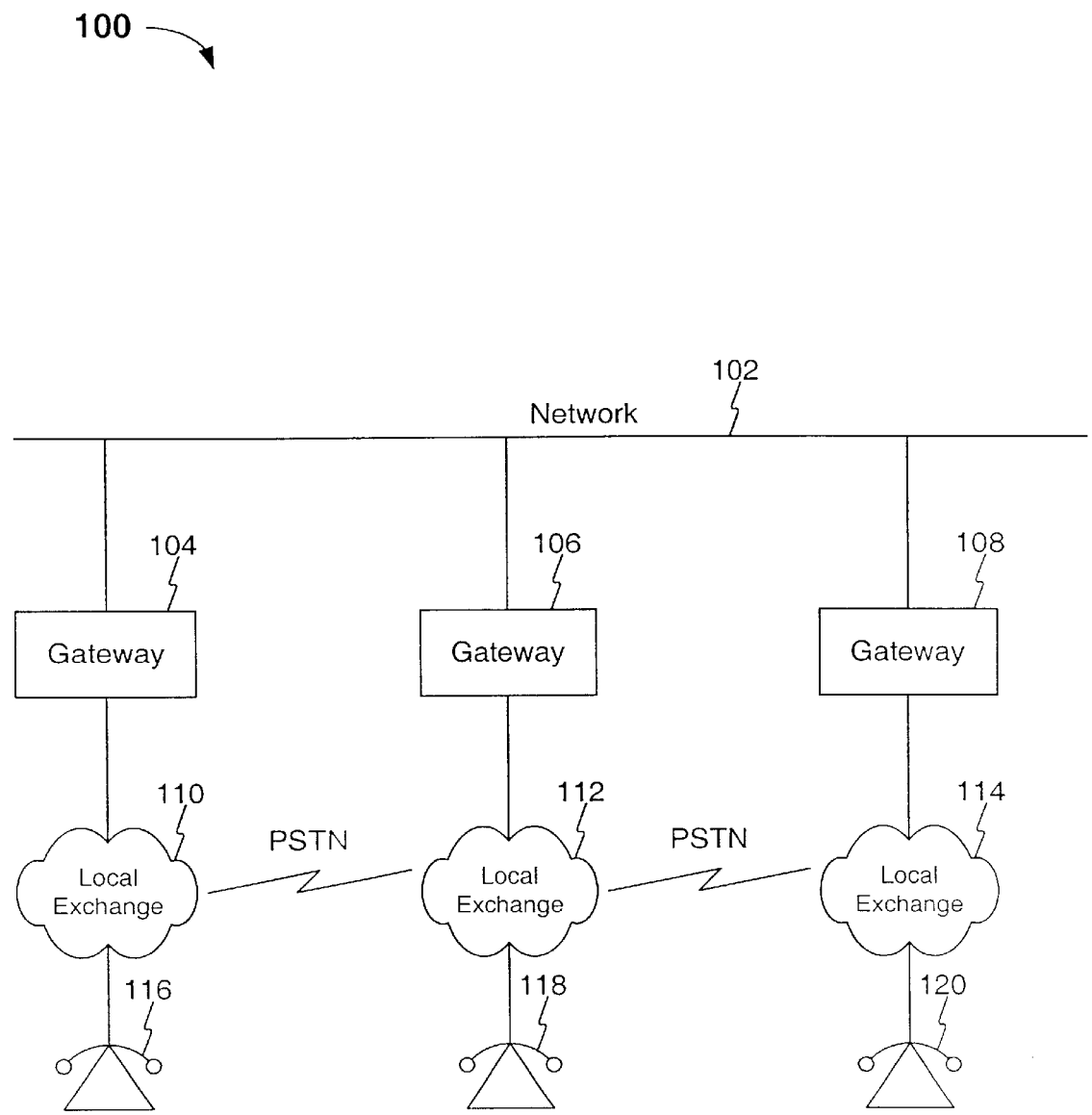
FIG. 1 is a block diagram showing an example system architecture, according to an embodiment of the invention, showing network connectivity among various components.

FIG. 1 is a block diagram showing an example VoIP system 100, according to an embodiment of the invention, showing the network connectivity among the various components. It should be understood that the particular example VoIP system 100 in FIG. 1 is shown for illustrative purposes only and does not limit the invention.

The VoIP system 100 includes a network 102 which connects gateways 104, 106, and 108. Network 102 is a packet-switched network capable of serving as an intranet, internet, and/or connecting to the global Internet. Gateways 104, 106, and 108 can be physically located anywhere that allows connectivity with network 102.

Each of gateways 104, 106, and 108 are connected to a local exchange. As shown in FIG. 1, gateway 102 is connected to local exchange 110; gateway 106 is connected to local exchange 112; gateway 108 is connected to local exchange 114.

Local exchanges 110, 112, and 114 are each connected to the PSTN.

Telephones 116, 118, and 120 are each connected to a local exchange. Telephone 116 is connected to local exchange 110. Telephone 118 is connected to local exchange 112. Telephone 120 is connected to local exchange 114.

Telephones 116, 118, and 120 are representative of any number of telephones connected to a given local exchange. Typically, calls within a local exchange are toll-free or "local" calls. Calls from a telephone in one local exchange to a telephone in another local exchange are typically considered toll calls or long distance calls.

Figure 2:
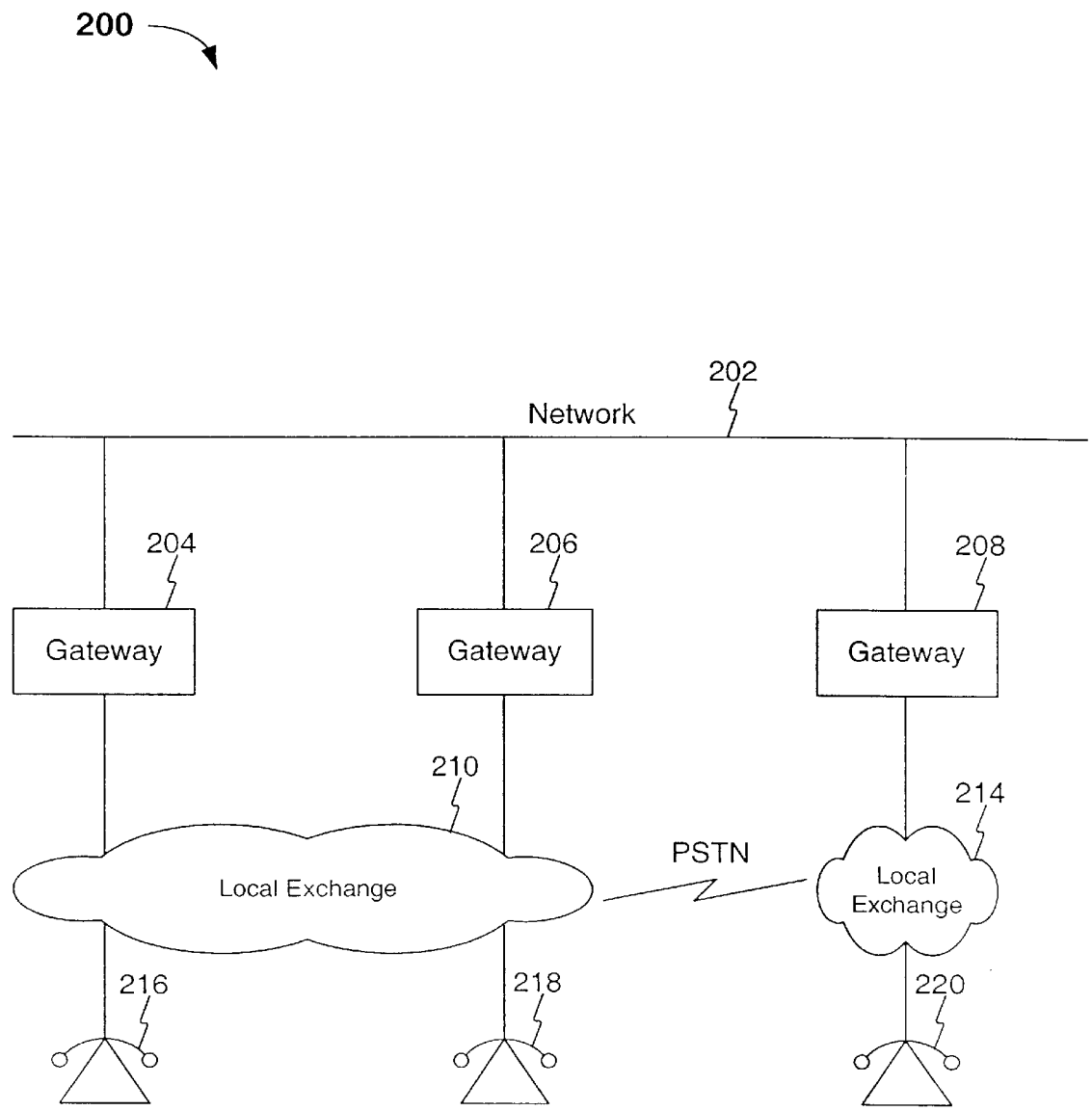
FIG. 2 is a block diagram showing an alternative example system architecture, according to an embodiment of the invention, showing network connectivity among the various components.

FIG. 2 is a block diagram showing an example VoIP system 200, according to an alternative embodiment of the invention, showing the network connectivity among the various components. It should be understood that the particular example VoIP system 200 in FIG. 2 is shown for illustrative purposes only and does not limit the invention.

VoIP system 200 has substantially similar components to VoIP system 100. VoIP system 200 differs from VoIP system 100 in that gateways 204 and 206 are connected to the same local exchange, local exchange 210. The purpose of illustrating this difference is to illustrate a feature of embodiments of the invention. It is a feature of the invention that routing decisions can take into account the physical locations of local exchanges when determining the route to use when placing a call over the VoIP systems of the invention.

Figure 3:
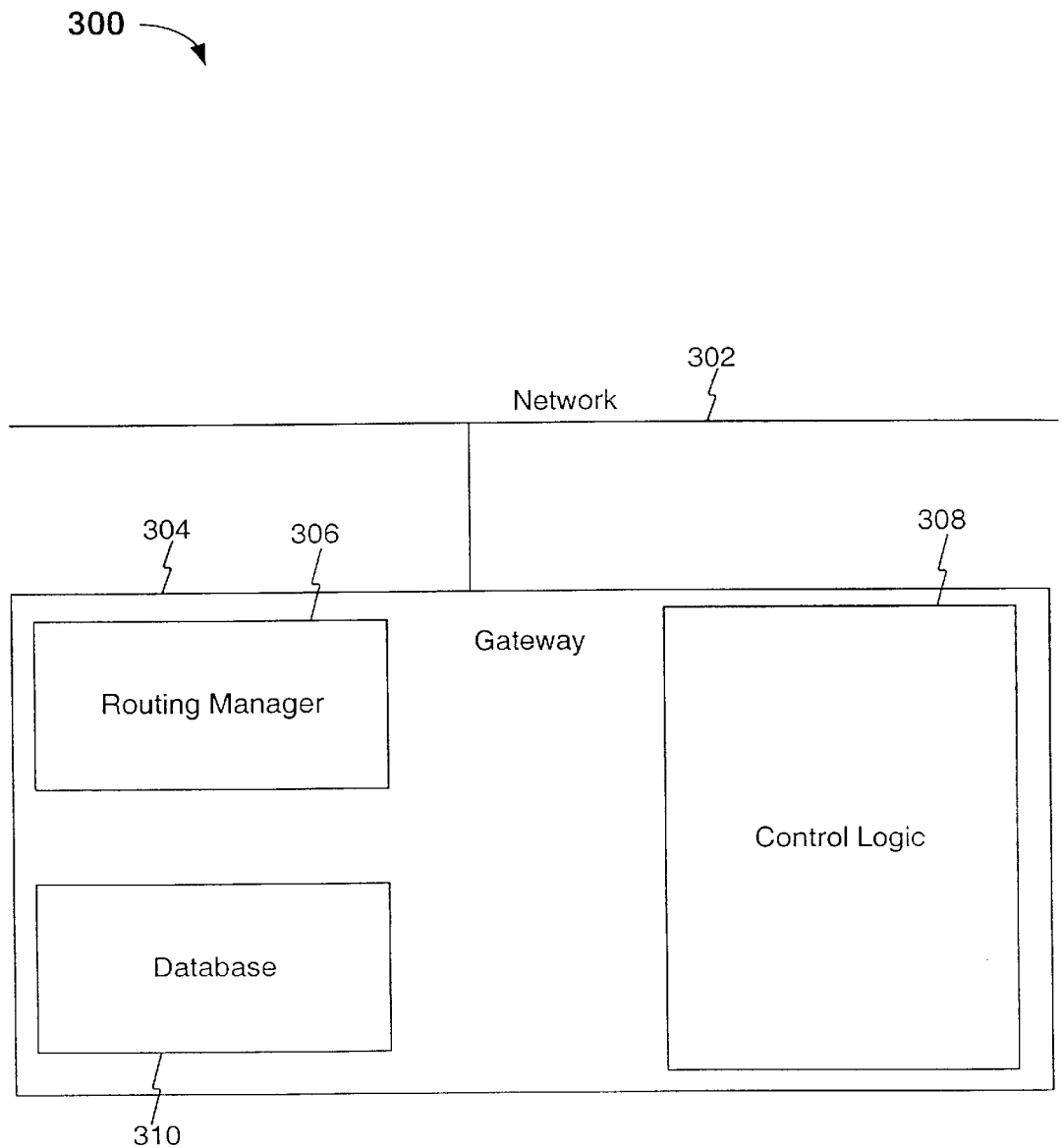
FIG. 3 is a block diagram showing a gateway that includes a routing manager, according to an embodiment of the invention.

Referring to FIG. 3, a block diagram 300, according to an embodiment of the invention, is shown.

Block diagram 300 shows a network 302 connected to gateway 304. Gateway 304 contains routing manager 306, control logic 308, and database 310. Routing manager 306 provides route checking and selection routines as described herein. Routing manager 306 can be implemented in hardware or software or some combination of hardware and software. Control logic 308 provides additional functionality for voice coding and decoding, user logging, and other VoIP features. Database 310 stores, among other things, the results of route tests, route checking parameters, and route information as described herein. Database 310 can store additional instructions for routing manager 306 to perform.

Figure 4:
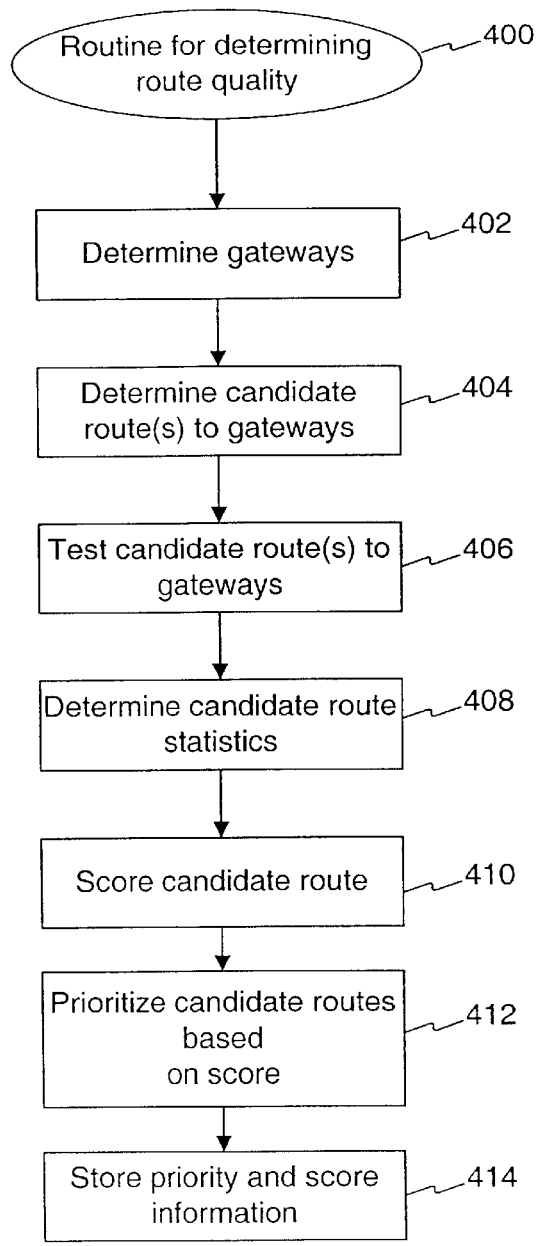
FIG. 4 is a flowchart illustrating a routine for determining route quality according to an embodiment of the invention.

Referring to FIG. 4, a flowchart 400 of routine for determining route quality, according to an embodiment of the invention, is shown.

In step 402, the routing manager 306 determines which other gateways are available to route calls. In one embodiment, routing manager 306 can obtain this information from database 310. In another embodiment, a separate routing server (not shown) can provide information about available gateways. The database 310 and routing server are described in detail in a commonly-owned U.S. patent application Ser. No. 09/527,920, entitled "Method, System, and Computer Program Product for Managing Routing Servers and Services," incorporated herein by reference in its entirety.

In step 404, the routing manager 306 determines the candidate route(s) to the gateways that were determined in step 402. In one embodiment, candidate route(s) are determined by a tracing operation which determines the physical network route to a gateway. In another embodiment, database 310 provides one or more candidate route(s) for each gateway from each other gateway. Candidate routes can include transitions from network 102 to the PSTN via a local exchange, such as local exchange 112. In one embodiment, routing manager 306 determines the availability of candidate routes to each of gateways 204, 206, and 208.

In step 406, the routing manager 306 tests the candidate route(s) to the gateways. An embodiment of step 406 is discussed further detail in FIG. 5. In an embodiment, routing manager 306 is able to determine information about each gateway tested, such as, but not limited to, the local exchange of each gateway, and services supported by each gateway.

In step 408, the routing manager 306 determines the candidate route statistics based on the information returned in testing step 406. For example, routing manager 306 determines the latency between its gateway and the other tested gateways. Additional details and embodiments are discussed with respect to FIG. 5.

In step 410, the routing manager 306 scores the candidate route(s) based on the statistics determined in step 408. In one embodiment, the routing manager 306 scores candidate route(s) based on both the statistics determined in step 408 and stored information from previous tests. In another embodiment, routing manager 306 scores routes based on an averaging of the statistics either determined or stored or a combination of both.

In step 412, the routing manager 306 prioritizes candidate routes based on their score and the requirements of user. In one embodiment, the candidate routes are prioritized at the time a user places a call that utilizes a gateway.

In one embodiment, a user can priorite routes for overall voice quality. For example, in FIG. 2, a user can select criteria which allows the system to select routes in conformance to those criteria. For instance, in the case for high voice quality, routes are selected which meet high voice quality standards, and where such network routes are unavailable, the PSTN routes are substituted. This routing can be more expensive than routing entirely on network 102 because the PSTN is accessed whenever voice quality would suffer, but such alternate routing is possible because the user is able to select and prioritize the criteria for their call.

In an further embodiment, gateway 104 may be in Albany, N.Y.; gateway 108 may be in Manhattan, N.Y.; and gateway 106 may be in Chicago, Ill. If the user is calling from a local exchange with an orginating gateway in London, England, then the least expensive call to Chicago, Ill. is over network 102 to gateway 106. However, if the call quality is below a preset level, then the call is routed alternatively. If routing to gateway 104 provides high enough call quality, then the remainder of the call is routed over the PSTN to local exchange 112 via local exchange 110. Therefore, while some PSTN costs may be incurred, the overall costs are still much lower than calling directly from London to Chicago over the PSTN. Furthermore, voice quality is maintained.

In an alterative embodiment, gateways may be connected to the same local exchange as other gateways, as shown in FIG. 2. Thus, voice quality can be maintained without increases in cost by routing to an alternative gateway in the same local exchange. This embodiment has a further advantage of allowing for network traffic management.

In step 414, the routing manager 306 stores the priority and score information. In an embodiment, this information is stored in database 310.

Figure 5:
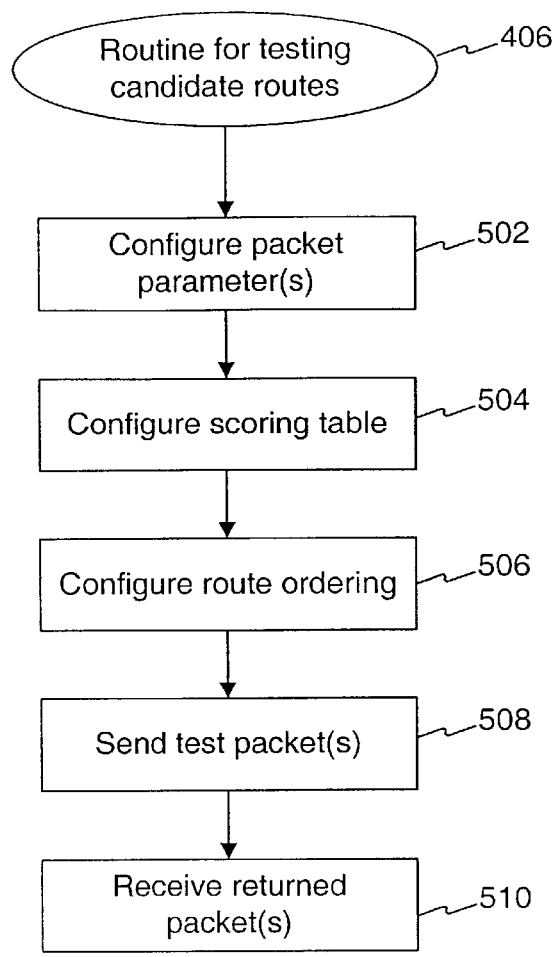
FIG. 5 is a flowchart illustrating a routine for candidate route testing according to an embodiment of the invention.

Referring to FIG. 5, a flowchart 500 of routine for testing candidate routes, according to an embodiment of the invention, is shown.

In step 502, the routing manager 306 configures the packet parameters. In one embodiment, packets can be set to specific size. Packets can also be sent in groups (numbers of packets). Further, packets can be scheduled to be sent prior to a call or they can be scheduled at regular intervals.

Figure 7:
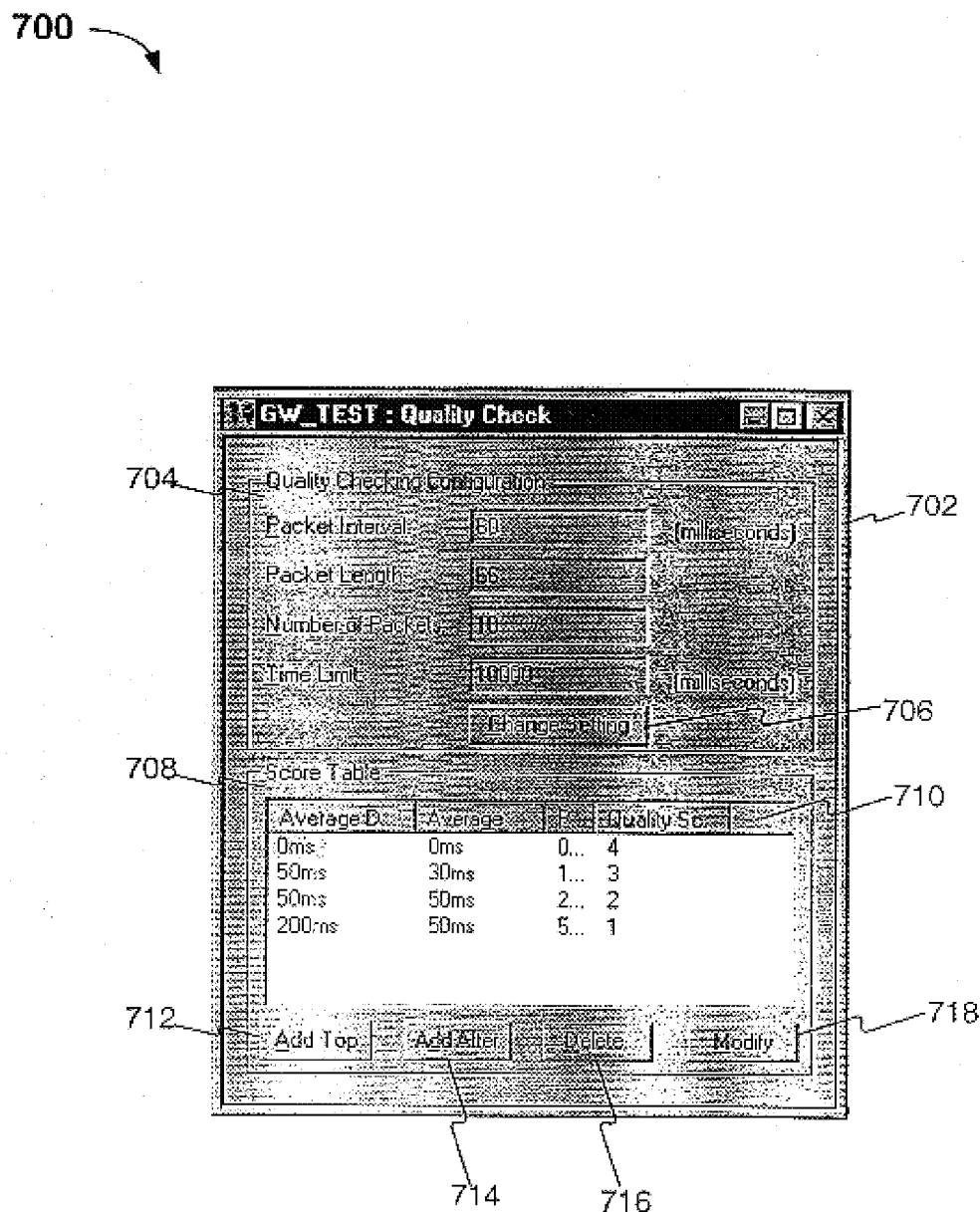
FIG. 7 is an exemplary route scoring configuration screen according to an embodiment of the invention.

In step 504, the routing manager 306 configures a scoring table. In one embodiment, a scoring table consists of heirarchical levels assigned to specific values for the parameters being tested. An example scoring table is shown in FIG. 7 as score table panel 708. The results (latency, jitter, etc.) of the candidate route testing (see below) are then compared to the values assigned to the levels of the scoring table. Candidate routes are assigned a score based on the level that matches their results.

In step 506, the routing manager 306 configures the route ordering. Each route is assigned a level (or score) in step 504. The route ordering is determined by user set values, which order or prioritize routes based on factors that include a route's level. In one embodiment, the system can order the routes based on their network address (IP address), cost estimate (the estimated cost for using the route), preference (general user preference), quality of service (the route's score), and static routes (whether the route is static or unchanging and therefore likely to be more reliable).

While the actual scoring and ordering of routes occurs after the testing steps of testing step 406, the levels of routes and route level ordering can be determined prior to actual testing.

In step 508, the routing manager 306 sends test packet(s). In one embodiment, the routing manager 306 first creates a user datagram protocol (UDP) socket used for sending and receiving quality measurement packets; then automatically responds to requests on the socket without any delay; and finally sends messages to the corresponding socket on other gateways to measure the quality of server to those other gateways. In the above-described step UDP packets are used. However, as one skilled in the relevant art will recognize other protocols can be used (for example, TCP).

In step 510, the routing manager 306 receives returned test packet(s). In an embodiment, the destination gateways receive a quality measurement packet from another gateway and return a packet back to the originating gateway as soon as possible. The returned packet includes information about the packet that was received by the destination gateway.

As described above, the routing manager 306 measures the returned packets and determines a score for the route(s).

Measurement and Scoring Embodiments

In embodiments, the measurement and scoring processes of the invention include determining the packet trip time of candidate route, calculating the average variation in the trip time of a measurement packet, and determining the packet loss by counting the number of packets that were not returned.

For example, table 1 shows example results from the above-described testing process.

TABLE 1

| Pkt | Send Time | Receive Time | Delay | Jitter |
|---|---|---|---|---|
| n | x | y | y-x | \|(y-x)-(y-x)ave\| |
| 1 | 0 ms | 45 ms | 45 ms | 0 ms |
| 2 | 60 ms | 110 ms | 50 ms | 5 ms |
| 3 | 120 ms | 160 ms | 40 ms | 5 ms |

From these results the average delay, average jitter, and packet loss can be calculated, as shows for one candidate route in table 2 below for the three packets shown in table 1.

TABLE 2

| Average Delay | Average Jitter | Packet Loss |
|---|---|---|
| 45 ms | 3 ms | 0% |

The packet loss percentage becomes more important even at low levels. Five (5) per-cent packet loss may be entirely unacceptable to a user. These figures can be used to score a candidate route as in step 410 by assigning a score to the route based on the results of the tests shown above. In this way, the invention can automatically select the proper route for a call.

Furthermore, as one skilled in the relevant art(s) based on the teachings described herein would recognize, these embodiments can be implemented with any of the methods discussed herein, where the routing manager of the invention is determining and/or testing candidate routes.

The above-mentioned figures are exemplary illustrations of features of the present invention and are not intended to limit the present invention in any way. All the embodiments described herein can be combined with each other to form alternative processes of using the invention. Specifically, several features of the invention can be implemented in combination with other features of the invention to form further embodiments. For example, steps 508 and 510 of FIG. 5 can be repeated for each call received by the gateway 304, while the other steps shown in FIG. 5 would only be performed if the particular user required a modification.

Graphical User Interface

In one embodiment of the invention, the routing manager 306 provides input (GUI) screens. The gateway 304 (as shown in FIG. 3) allows users to view and add configuration information for routing manager 306.

As will be apparent to one skilled in the relevant art(s), the GUI allows users of routing manager 306 to specify all inputs (e.g., general settings, route ordering, and routing servers) and options (e.g., packet settings, and scoring tables) described herein.

Figure 6:
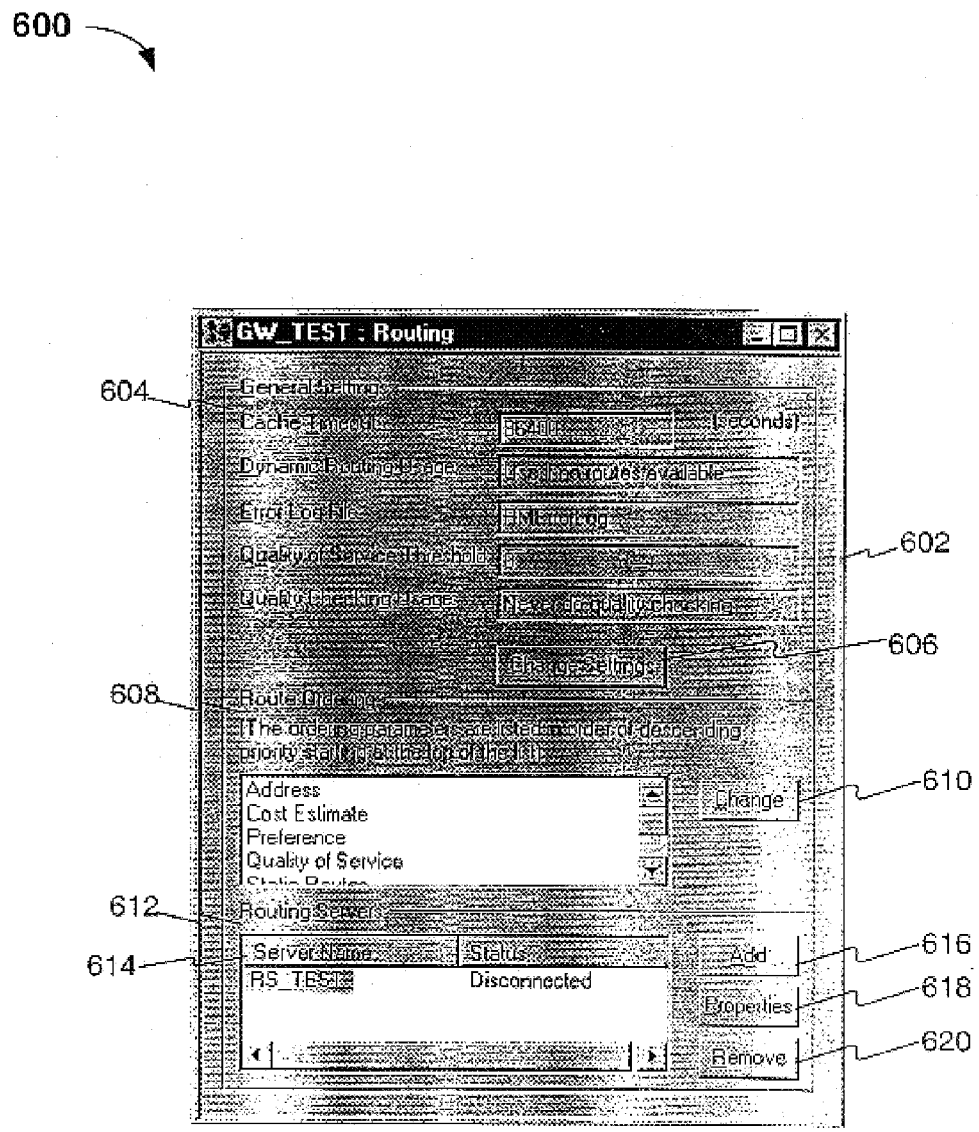
FIG. 6 is an exemplary route testing configuration screen according to an embodiment of the invention.

FIGS. 6, and 7 show example interface screens of the present invention.

These screens are exemplary and for illustrative purposes only, as the present invention is sufficiently flexible to allow different screen designs. It should be noted that the particular information appearing in input screens of the routing manager 306, result from the information entered by the user. Thus, it will be apparent to one skilled in the relevant art(s) that the configuration defined in steps 502, 504, and 506 utilize the information that will be entered in the screens during operation of the routing manager 306.

Referring to FIG. 6, a routing configuration screen 602 for entering and modifying routing manager 306 settings is shown.

Screen 602 includes a general settings panel 604, a route ordering panel 608, and a routing servers panel 612.

General settings panel 604 includes a change settings link 606 to add, modify, and/or delete the settings displayed in general settings panel 604. As shown in FIG. 6, some settings are cache timeout in seconds, dynamic routing usage, error log file name, quality of service threshold, and quality checking usage. Cache timeout refers to the amount of time (here set to 86,400 seconds or 24 hours) that the cache of stored candidate route scores are stored. In other words, according to one embodiment, each candidate route is tested once every 24 hours and given a new score. Dynamic routing usage refers to the use of alternative routes obtains dynamically from other gateways, as described in detail in a previously cited, commonly-owned U.S. patent application Ser. No. 09/527,920 incorporated herein by reference in its entirety. Error log file provides the name of a file to which error or condition messages may be saved. Quality of service threshold refers to the minimum value that a route can have and still be stored for use by the system of the invention. Quality checking usage refers to enabling the use of route quality checking. For example, according to embodiments of the invention, route testing can be disabled, and route ordering will still take place, albeit without the benefit of quality of service information. These settings can be altered to activate or deactivate the usage of route quality checking. Additionally, a quality of service threshold can be set to determine when route quality checking should be activated automatically.

Route ordering panel 608 includes a change link 610 to add, modify, and/or delete the settings displayed in route ordering panel 608. As shown in FIG. 6, some settings are address (i.e domain name or IP address), cost estimate, preference, quality of service, and static routes (truncated in the panel's window). In this way, a user can prioritize the parameters with which routes are selected. In a broad application, cost estimate can be highly prioritized to limit the range of routes includes in subsequent selections. Quality of service can be similarly applied.

Routing servers panel 612 includes listings window 614, an add link 616, a properties link 618 and a remove link 620. Listings window 614 presents the entered servers and their status. In one embodiment, these servers are used to provide candidate routes for testing. Add link 616 allows a user to add additional servers. Properties link 618 allows a user to configure the properties of a server displayed in listings window 614. Remove link 620 deleted a server from listings window 614.

Referring to FIG. 7, a quality testing configuration screen 702 for entering and modifying routing manager 306 settings is shown.

Screen 702 includes quality checking configuration panel 704, and score table panel 708.

Quality checking configuration panel 704 includes a change setting link 706 for modifying the packet parameters shown in panel 704. Packet parameters include, but are not limited to those shown, such as packet interval, which is the rate at which packets are sent, packet length, the number of packets, and the time limit over which packets are to be sent.

Score table panel 708 includes listings window 710, add top link 712, add after link 714, delete link 716, and modify link 718. Links 712, 714, 716, and 718 allow a user to maintain, update and reset the scoring levels shown in listings window 710. Specifically, add top link 712 allows a user to add a score level to the top of the list of score levels. Similarly, add after link 714 allows a user to add a score level below a selected score level. In an embodiment, the scoring table is read from top to bottom and levels assigned to candidate routes based on the first conforming score level.

Listings windows 710 displays the parameters used to score routes. As shown in FIG. 7, these can include average delay, average jitter, packet loss, and quality score (some partially truncated). The average delay, average jitter, and packet loss are determined by the testing methods disclosed herein. For each user defined level of average delay, average jitter and packet loss is also assigned a quality score. The quality score is assigned to a route that is scored as having met the other criteria entered in listings window 710.

Description of the example screens in these terms is provided for convenience only. It is not intended that the invention be limited to application in these example screens. In fact, after reading the description contained herein, it will become apparent to a person skilled in the relevant art(s) how to implement the invention with alternative screens.

Example Computer System

Figure 8:
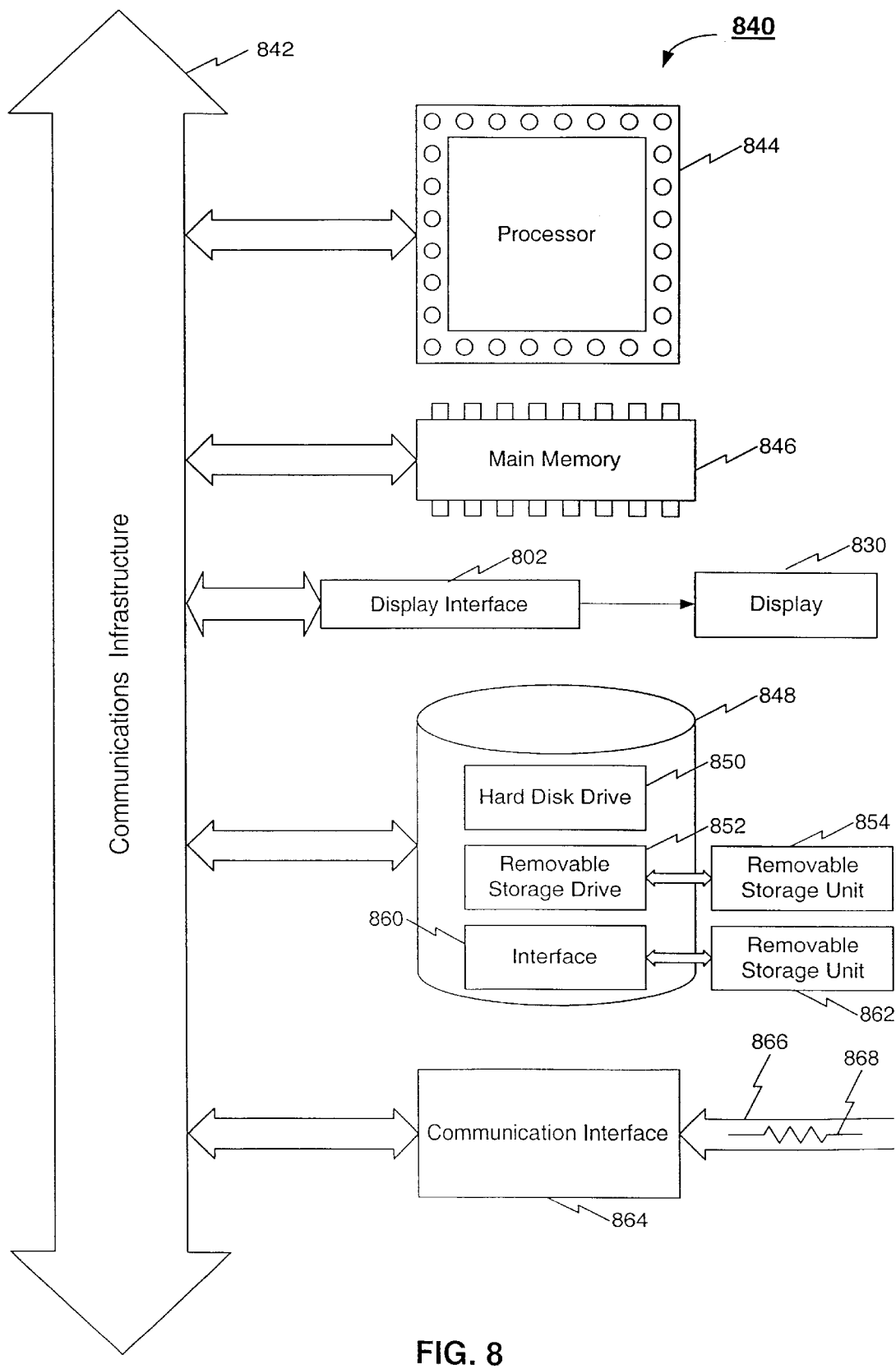
FIG. 8 is an example computer system in one example implementation of the present invention.

An example of a computer system 840 is shown in FIG. 8. The computer system 840 represents any single or multi-processor computer. In conjunction, single-threaded and multi-threaded applications can be used. Unified or distributed memory systems can be used.

Computer system 840 includes one or more processors, such as processor 844. One or more processors 844 can execute software implementing routines 300, and 400 as described above. Each processor 844 is connected to a communication infrastructure 842 (e.g., a communications bus, cross-bar, or network). Various software embodiments are described in terms of this exemplary computer system. After reading this description, it will become apparent to a person skilled in the relevant art how to implement the invention using other computer systems and/or computer architectures.

Computer system 840 can include a display interface 802 that forwards graphics, text, and other data from the communication infrastructure 842 (or from a frame buffer not shown) for display on the display unit 830.

Computer system 840 also includes a main memory 846, preferably random access memory (RAM), and can also include a secondary memory 848. The secondary memory 848 can include, for example, a hard disk drive 850 and/or a removable storage drive 852, representing a floppy disk drive, a magnetic tape drive, an optical disk drive, etc. The removable storage drive 852 reads from and/or writes to a removable storage unit 854 in a well known manner. Removable storage unit 854 represents a floppy disk, magnetic tape, optical disk, etc., which is read by and written to by removable storage drive 852. As will be appreciated, the removable storage unit 854 includes a computer usable storage medium having stored therein computer software and/or data.

In alternative embodiments, secondary memory 848 may include other similar means for allowing computer programs or other instructions to be loaded into computer system 840. Such means can include, for example, a removable storage unit 862 and an interface 860. Examples can include a program cartridge and cartridge interface (such as that found in video game devices), a removable memory chip (such as an EPROM, or PROM) and associated socket, and other removable storage units 862 and interfaces 860 which allow software and data to be transferred from the removable storage unit 862 to computer system 840.

Computer system 1040 can also include a communications interface 864. Communications interface 864 allows software and data to be transferred between computer system 840 and external devices via communications path 866. Examples of communications interface 864 can include a modem, a network interface (such as Ethernet card), a communications port, etc. Software and data transferred via communications interface 864 are in the form of signals which can be electronic, electromagnetic, optical or other signals capable of being received by communications interface 864, via communications path 866. Note that communications interface 864 provides a means by which computer system 840 can interface to a network such as the Internet.

In this document, the term "computer program product" is used to generally refer to removable storage unit 854, a hard disk installed in hard disk drive 850, or a carrier wave carrying software over a communication path 866 (wireless link or cable) to communication interface 864. A computer useable medium can include magnetic media, optical media, or other recordable media, or media that transmits a carrier wave or other signal. These computer program products are means for providing software to computer system 840.

Computer programs (also called computer control logic) are stored in main memory 846 and/or secondary memory 848. Computer programs can also be received via communications interface 854. Such computer programs, when executed, enable the computer system 840 to perform the features of the present invention as discussed herein. In particular, the computer programs, when executed, enable the processor 844 to perform the features of the present invention. Accordingly, such computer programs represent controllers of the computer system 840.

The present invention can be implemented as control logic in software, firmware, hardware or any combination thereof. In an embodiment where the invention is implemented using software, the software may be stored in a computer program product and loaded into computer system 840 using removable storage drive 852, hard drive 850, or interface 860. Alternatively, the computer program product may be downloaded to computer system 840 over communications path 866. The control logic (software), when executed by the one or more processors 844, causes the processor(s) 844 to perform the functions of the invention as described herein.

In another embodiment, the invention is implemented primarily in firmware and/or hardware using, for example, hardware components such as application specific integrated circuits (ASICs). Implementation of a hardware state machine so as to perform the functions described herein will be apparent to persons skilled in the relevant art(s).

Conclusion

While various embodiments of the invention have been described above, it should be understood that they have been presented by way of example, and not limitation. It will be apparent to persons skilled in the relevant art that various changes in form and detail may be made therein without departing from the spirit and scope of the invention. This is especially true in light of technology and terms within the relevant art(s) that may be later developed. Thus the invention should not be limited by any of the above-described exemplary embodiments, but should be defined only in accordance with the following claims and their equivalents.

What is claimed is:

1. A method for assessing network routes for use in establishing a communications link within a communications network, comprising the steps of:
   (1) identifying a plurality of candidate routes that can be used to establish said communication link, wherein a terminating gateway associated with each of said plurality of candidate routes is identified;
   (2) transmitting quality measurement packets for each of said candidate routes, wherein said quality measurement packets can be used to determine at least one route quality metric;
   (3) receiving returned quality measurement packets for each of said candidate routes, wherein said returned quality measurement packets can be used to determine route statistics;
   (4) determining route statistics, wherein said route statistics are based on routing information contained within said quality measurement packets;
   (5) configuring a route ordering schedule based on user set levels of route characteristics; and
   (6) scoring each of said candidate routes based on route statistics and said route ordering schedule, wherein a scoring table is configured that includes a quality score and one or more of packet loss, average delay, and average jitter.

2. A method of claim 1, wherein said communications network includes a packet-switched network.

3. A method of claim 1, wherein said communications network includes a public switched telephone network (PSTN).

4. A method of claim 1, wherein said at least one quality metric includes one or more of latency, time jitter, and lost packet information.

5. A method of claim 1, further comprising the steps of:
   (7) prioritizing each of said candidate routes among other tested routes based on a score obtained in said step of scoring; and
   (8) storing said score related to each of said candidate routes for use in route selection.

6. A method of claim 1, wherein step (2) parameters within quality measurement packets include one or more of packet interval, packet length, number of packets, and time limit.

7. A system for assessing network routes for use in establishing a communications link within a communications network, comprising:
   (1) means for identifying a plurality of candidate routes that can be used to establish said communications link, wherein a terminating gateway associated with each of said plurality of candidate routes is identified;
   (2) means for transmitting quality measurement packets for each of said candidate routes, wherein said quality measurement packets can be used to determine at least one route quality metric;
   (3) means for receiving returned quality measurement packets for each of said candidate routes, wherein said returned quality measurement packets can be used to determine route statistics;
   (4) means for determining route statistics, wherein said route statistics are based on routing information contained within said quality measurement packets;
   (5) means for configuring a route ordering schedule based on user set levels of route characteristics; and
   (6) means for scoring each of said candidate routes based on route statistics, wherein a scoring table is configured that includes a quality score and one or more of packet loss, average delay, and average jitter.

8. A system of claim 7, wherein said communications network includes a packet-switched network.

9. A system of claim 7, wherein said communications network includes a public switched telephone network (PSTN).

10. A system of claim 7, wherein said at least one quality metric includes one or more of latency, time jitter, and lost packet information.

11. A system of claim 7, further comprising:
    (7) means for prioritizing each of said candidates route among other tested routes based on a score obtained in said step of scoring; and
    (8) means for storing said score related to each of said candidate routes for use in route selection.

12. A system of claim 7, wherein testing means comprises:
    means for configuring parameters for said quality measurement packets, wherein said parameters include one or more of packet interval, packet length, number of packets, and time limit.

13. A computer program product comprising a computer usable medium having computer readable program code means embodied in said medium for causing an application program to execute on a computer that a assesses network routes for use in establishing a communications link within a communications network, said computer readable program code means comprising:
    a first computer readable program code means for causing the computer to identify a plurality of candidate routes that can be used to establish said communications link, wherein a terminating gateway associated with each of said plurality of candidate routes is identified;
    a second computer readable program code means for causing the computer to transmitting quality measurement packets for each of said candidate routes, wherein said quality measurement packets can be used to determine at least one route quality metric;
    a third computer readable program code means for causing the computer to receive returned quality measurement packets for each of said candidate routes, wherein said returned quality measurement packets can be used to determine route statistics;
    a fourth computer readable program code means for causing the computer to determine route statistics, wherein said route statistics are based on routing information contained within said quality measurement packets;
    a fifth computer readable program code means for causing the computer to configure a route ordering schedule based on user set levels of route characteristics; and a sixth computer readable program code means for causing the computer to score each of said candidate routes based on route statistics and said route ordering schedule, wherein a scoring table is configured that includes a quality score and one or more of packet loss, average delay, and average jitter.

14. A computer program product of claim 13, wherein said communications network includes a packet-switched network.

15. A computer program product of claim 13, wherein said communications network includes a public switched telephone network (PSTN).

16. A computer program product of claim 13, wherein said at least one quality metric includes one or more of latency, time jitter, and lost packet information.

17. A computer program product of claim 13, further comprising:
    a seventh computer readable program means for causing the computer to prioritize each of said candidate routes among other tested routes based on a score obtained in said step of scoring; and
    an eighth computer readable program code means for causing the computer to store said score related to each of said candidate routes for use in route selection.

18. A computer program product of claim 13, wherein the third computer readable program code means comprises:
    a ninth computer readable program code means for causing the computer to configure parameters for said quality measurement packets, wherein said parameters include one or more of packet interval, packet length, number of packets, and time limit.

19. A method of claim 1, wherein step (5) further comprises configuring a scoring table that includes a quality score, packet loss, average delay, and average jitter.

20. A method of claim 1, wherein said communications link establishes a VOIP connection.

21. A method for assessing network routes for use in establishing a communications link within a communications network, comprising the steps of:
    (1) determining a gateway available for routing, wherein said gateway is capable of responding to a request on said communications network;
    (2) determining a candidate route to said gateway, wherein said candidate route is within said communications network;
    (3) testing said candidate route to said gateway using quality measurement packets, wherein said quality measurement packets include route information, wherein said testing comprises:
        (a) configuring parameters for said quality measurement packets to be sent to said gateway, wherein said parameters include the packet interval, packet length, number of packets, and time limit;
        (b) configuring a scoring table for use in scoring said candidate routes, wherein said table includes a quality score, packet loss, average delay, and average jitter;
        (c) configuring a route ordering applied for said gateway, wherein said route ordering includes file logging information, quality of service threshold, and timeout amount;
        (d) forwarding quality measurement packets to said gateway, wherein said quality measurement packets include routing information; and
        (e) receiving returned quality measurement packets from said gateway, wherein said returned quality measurement packets include routing information;
    (4) determining route statistics, wherein said route statistics are based on routing information contained within said quality measurement packets; and
    (5) scoring said candidate routes with said route statistics.

22. A system for assessing network routes for use in establishing a communications link within a communications network, comprising the steps of:
    (1) first means for determining a gateway available for routing, wherein said gateway is capable of responding to a request on said communications network;
    (2) second means for determining a candidate route to said gateway, wherein said candidate route is within said communications network;
    (3) means for testing said candidate route to said gateway using quality measurement packets, wherein said quality measurement packets include route information, wherein said testing means comprises:
        (a) first means for configuring parameters for said quality measurement packets to be sent to said gateway, wherein said parameters include the packet interval, packet length, number of packets, and time limit;
        (b) second means for configuring a scoring table for use in scoring said candidate routes, wherein said table includes a quality score, packet loss, average delay, and average jitter;
        (c) third means for configuring a route ordering applied for said gateway, wherein said route ordering includes file logging information, quality of service threshold, and timeout amount;
        (d) means for forwarding quality measurement packets to said gateway, wherein said quality measurement packets include routing information; and
        (e) means for receiving returned quality measurement packets from said gateway, wherein said returned quality measurement packets include routing information;
    (4) third means for determining route statistics, wherein said route statistics are based on routing information contained within said quality measurement packets; and
    (5) means for scoring said candidate routes with said route statistics.

23. A computer program product comprising a computer usable medium having computer readable program code means embodied in said medium for causing an application program to execute on a computer that assesses network routes for use in establishing a communications link within a communications network, comprising the steps of:
    (1) a first computer readable program code means for causing the computer to determine a gateway available for routing, wherein said gateway is capable of responding to a request on said communications network;
    (2) a second computer readable program code means for causing the computer to determine a candidate route to said gateway, wherein said candidate route is within said communications network;
    (3) a third computer readable program code means for causing the computer to test said candidate route to said gateway using quality measurement packets, wherein said quality measurement packets include route information, wherein said third computer readable program code means comprises:
        (a) a sixth computer readable program code means for causing the computer to configure parameters for said quality measurement packets to be sent to said gateway, wherein said parameters include the packet interval, packet length, number of packets, and time limit;

(b) a seventh computer readable program code means for causing the computer to configure a scoring table for use in scoring said candidate routes, wherein said table includes a quality score, packet loss, average delay, and average jitter;

(c) an eighth computer readable program code means for causing the computer means to configure a route ordering applied for said gateway, wherein said route ordering includes file logging information, quality of service threshold, and timeout amount;

(d) a ninth computer readable program code means for causing the computer to forward quality measurement packets to said gateway, wherein said quality measurement packets include routing information; and (e) a tenth computer readable program code means for causing the computer to receive returned quality measurement packets from said gateway, wherein said returned quality measurement packets include routing information;

(4) a fourth computer readable program code means for causing the computer to determine route statistics, wherein said route statistics are based on routing information contained within said quality measurement packets; and (5) a fifth computer readable program code means for causing the computer to score said candidate routes with said route statistics.

* * * * *